US010652888B2

(12) United States Patent
McInnis et al.

(10) Patent No.: US 10,652,888 B2
(45) Date of Patent: May 12, 2020

(54) REAL-TIME LOCATION SYSTEM NETWORK POLICY CONFIGURATION CONTROL OF FIXED AND MOBILE ELEMENTS

(71) Applicant: The Boeing Company, Chicago, IL (US)

(72) Inventors: Michael D. McInnis, Port Orchard, WA (US); Payal Shah, Charleston, SC (US); Navpreet Singh, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 224 days.

(21) Appl. No.: 15/619,042

(22) Filed: Jun. 9, 2017

(65) Prior Publication Data

US 2018/0359753 A1 Dec. 13, 2018

(51) Int. Cl.
*H04W 72/04* (2009.01)
*H04W 64/00* (2009.01)
*H04W 4/02* (2018.01)
*H04W 48/18* (2009.01)

(52) U.S. Cl.
CPC ......... *H04W 72/0453* (2013.01); *H04W 4/02* (2013.01); *H04W 4/023* (2013.01); *H04W 64/00* (2013.01); *H04W 72/048* (2013.01); *H04W 48/18* (2013.01); *H04W 72/0493* (2013.01)

(58) Field of Classification Search
CPC ... H04W 72/0453; H04W 4/02; H04W 4/023; H04W 64/00; H04W 72/048; H04W 72/0493
See application file for complete search history.

(56) References Cited

U.S. PATENT DOCUMENTS 7,706,369 B2 * 4/2010 Roese .................. G01S 5/02
                                                                370/389
8,032,150 B2 * 10/2011 Cole .................. H04L 12/5692
                                                                455/456.1
9,384,654 B1 * 7/2016 Chillappa ............ G06Q 10/08
(Continued)

OTHER PUBLICATIONS

International Search Report for related European Application No. 18169051; search completed Sep. 13, 2018.

*Primary Examiner* — Habte Mered
(74) *Attorney, Agent, or Firm* — Miller, Matthias & Hull LLP (57) ABSTRACT

A system for allocating wireless frequency spectrum is provided. The system may include one or more location tags attached on one or more foreign network devices and domestic network devices, one or more real-time location tracking system configured to detect the one or more location tags, and at least one control unit in communication with at least one domestic network device. The control unit may be configured to query one or more proximity policies associated with the foreign network devices and the domestic network devices, apply a modified network configuration to one or more of the domestic network devices when at least one associated proximity policy is discovered, and restore a default network configuration, or setting the modified network configuration as a new default network configuration, to the one or more of the domestic network devices when the discovered proximity policy is no longer effective.

23 Claims, 3 Drawing Sheets

(56) References Cited

U.S. PATENT DOCUMENTS

| | | | |
|---|---|---|---|
| 9,549,309 B2* | 1/2017 | Karaoguz | H04W 48/18 |
| 9,736,704 B1* | 8/2017 | Jain | H04W 24/02 |
| 9,986,438 B2* | 5/2018 | Fortman | H04L 5/003 |
| 2006/0183426 A1* | 8/2006 | Graves | A61N 1/08 |
| | | | 455/63.1 |
| 2011/0310867 A1* | 12/2011 | Kennedy | G01C 21/3461 |
| | | | 370/338 |
| 2014/0206411 A1* | 7/2014 | Ruutu | H04W 64/00 |
| | | | 455/522 |
| 2014/0378179 A1 | 12/2014 | Nagai et al. | |
| 2015/0296386 A1 | 10/2015 | Menon et al. | |
| 2015/0319572 A1* | 11/2015 | Jalali | G06K 7/10009 |
| | | | 455/456.1 |
| 2016/0157150 A1* | 6/2016 | Wirtanen | H04W 48/16 |
| | | | 455/434 |
| 2016/0227360 A1* | 8/2016 | Huang | H04W 4/029 |
| 2018/0066863 A1* | 3/2018 | Hatch | F24F 11/30 |

\* cited by examiner

REAL-TIME LOCATION SYSTEM
NETWORK POLICY CONFIGURATION
CONTROL OF FIXED AND MOBILE
ELEMENTS

TECHNICAL FIELD

The present disclosure relates generally to network configurations, and more particularly, to systems and methods for configuring and controlling network devices based on real-time location.

BACKGROUND

The utility of networks and network devices continues to grow and is increasingly prevalent in various environments. Among other uses or applications, network devices are typically implemented in factory settings, manufacturing facilities, outdoor worksites, and related environments. Network-enabled machinery, vehicles, tasks, and the like, can be used to significantly improve efficiency and productivity, especially when used in conjunction with automation. Network devices may include mobile or vehicular devices, such as automated guided vehicles (AGVs), as well as fixed network devices.

However, as wireless networked devices become increasingly more commonplace in industrial settings, concerns relating to wireless network radio frequency spectrum congestion, co-channel interference, and coexistence are beginning to surface. A facility may, for example, incorporate multiple networks, which manage multiple groups of network devices across the networks. "Foreign" networks typically provided by third party vendors are typically building-wide in the sense that an entire building may be covered by a foreign network or foreign sub networks limited to a few specific RF channels. Domestic (operator supplied) networks are also building-wide but can be sub-divided into smaller sub-networks, where domestic devices roam from one sub-network to another. For example: A Wi-Fi Access Point operates on a specific RF channel, but physically adjacent Wi-Fi Access Points are set to different RF channels to provide coverage within a building without interference.

An added complexity in such environments is that foreign network devices may be mobile and may travel into the coverage range of nearby domestic networks while completing their assigned task. As such, automated networked environments can demand significant time and attention for preventing congestion or interference.

In order to mitigate interference between domestic and foreign network devices, it is possible to segregate frequency channels assigned to foreign network devices from those assigned to domestic network devices within the same spectrum. Alternatively, as a coexistence method within the same frequency spectrum, the transmission power on fixed or mobile domestic network devices may be permanently reduced on wireless channels also assigned to foreign network devices in order to avoid unwanted interference due to domestic and foreign network frequency channel overlap. However, while such techniques may reduce interference, they may also reduce the overall wireless spectrum coverage area available to any given domestic network fixed or mobile device.

Before proceeding, it should be appreciated that the present disclosure is directed to a system that may address some of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to accurately catalog or comprehensively summarize any prior art reference or practice. As such, the inventors expressly disclaim this section as admitted or assumed prior art.

SUMMARY OF THE DISCLOSURE

In accordance with one aspect of the present disclosure, a system is provided for allocating wireless frequency spectrum. The system may include one or more real-time location tracking tags or devices, attached on one or more fixed or mobile foreign network devices and fixed or mobile domestic network devices, one or more real-time location tracking systems configured to detect the one or more real-time location tracking tags, and at least one control unit in communication with at least one of the fixed or mobile domestic network devices. The real-time location tracking systems may include any of a wide variety of wireless technologies such as ultrasonic, radio frequency, optical (camera), and lightwave communication systems. The control unit may be configured to query one or more proximity policies associated with the foreign network devices and the domestic network devices, apply a modified network configuration to one or more of the domestic network devices when at least one associated proximity policy is discovered, and restore a default network configuration to the one or more of the domestic network devices when the discovered proximity policy is no longer effective.

In accordance with another aspect of the present disclosure, a control unit for allocating wireless frequency spectrum is provided. The control unit may include a tracking module and a configuration module. The tracking module may be configured to track locations of foreign network devices and domestic network devices. The configuration module may be configured to query one or more proximity policies from one or more databases where real-time location tracking system tag identifiers are cross associated with the foreign network device identifiers, domestic network device identifiers, and proximity policies which apply a modified network configuration to one or more of the domestic network devices when at least one associated proximity policy is discovered, and restore a default network configuration to the one or more of the domestic network devices when the discovered proximity policy is no longer effective.

In accordance with a further aspect of the present disclosure, a coexistence method of allocating wireless spectrum, wireless channels including but not limited to, wireless channel restrictions, wireless channel modulation, and transmitter or emitter output power level is provided. The method may include tracking locations of foreign network devices and domestic network devices, querying one or more proximity policies associated with the foreign network devices and the domestic network devices, applying a modified network configuration to one or more of the domestic network devices when at least one associated proximity policy is discovered, and restoring a default network configuration, or setting the modified network configuration as a new default network configuration, to the one or more of the domestic network devices when the discovered proximity policy is no longer effective. Proximity policies are configuration files for domestic and foreign wireless devices. Configuration files may be utilized to document wireless channels and spectra which foreign network devices are operating on. Domestic network configuration change files may be utilized to document wireless interface configuration parameters and options which are uploaded to incorporate changes within a domestic network device dependent on wireless spectrum coexistence policies. In addition, a coexistence management algorithm may be called upon to make wireless interface configuration change decisions when one or more proximity policy is discovered within a real-time location tracking system zone or between nearby adjacent zones. A location zone is defined as either a physical wireless coverage area, or virtual geo-location fence defined in real-time location tracking system.

The features, functions and advantages that have been discussed can be achieved independently in various embodiments or may be combined in yet other embodiments, further details of which can be seen with reference to the following description and drawings.

DETAILED DESCRIPTION

Although the following sets forth a detailed description of numerous different embodiments, it should be understood that the legal scope of protection is defined by the words of the claims set forth at the end of this patent. The detailed description is to be construed as example only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection. It should also be understood that, unless a term is expressly defined herein, there is no intent to limit the meaning of that term, either expressly or by implication, beyond its plain or ordinary meaning, and such term should not be interpreted to be limited in scope based on any statement made in any section of this patent other than the language of the claims. To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

Before moving to a detailed discussion, a brief overview is provided to aid the reader's later understanding. As may be apparent from the inventors' background observations above, there is a need to better manage both domestic and foreign network devices, so that network congestion and interference issues are minimized efficiently and without adversely limiting the available wireless spectrum. In various embodiments of the disclosed principles, the frequency usage in one network, e.g., a domestic network, is dynamically modified in order to allow temporary usage of network resources in response to detection of a foreign network device within the local network range. In this way, interference is minimized when a foreign network device enters the local network, but in the absence of any incursion by a foreign network device, the full local spectrum is available to local network devices.

Figure 1:
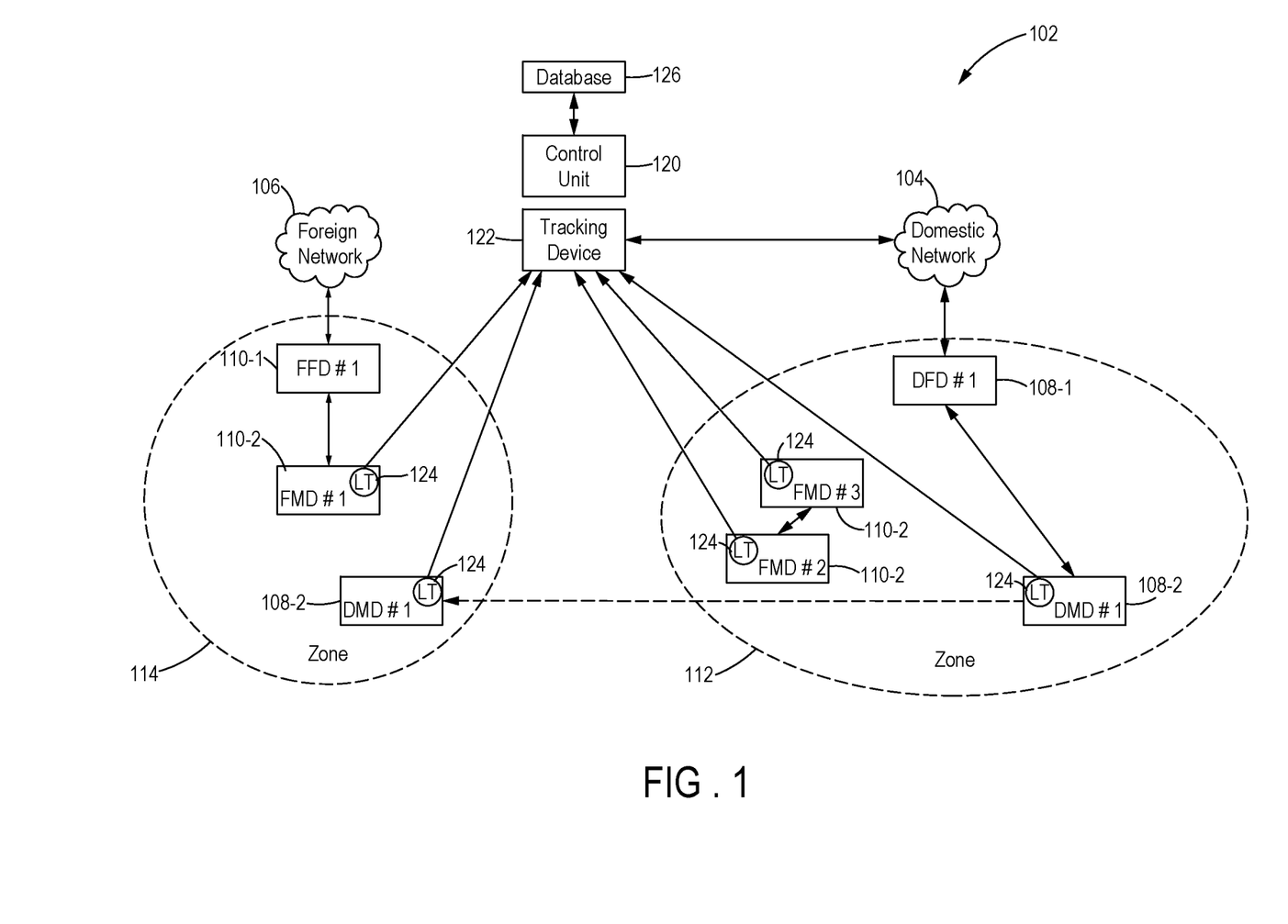
FIG. 1 is a diagrammatic view of an example management system for allocating a wireless frequency spectrum within a network environment arranged in accordance with one or more embodiments of the disclosed principles.

Referring now to FIG. 1, one example embodiment of a network management system for allocating a wireless frequency spectrum is provided within a network environment 102. The network environment 102 may be representative of a factory setting, a manufacturing facility, outdoor worksite, or any other environment which simultaneously supports two or more networks. As shown in FIG. 1 for example, a given network environment 102 may employ at least one local or domestic network 104 and at least one third-party or foreign network 106. Moreover, the domestic network 104 may serve one or more domestic network devices 108, while the foreign network 106 may serve one or more foreign network devices 110. Furthermore, the domestic network devices 108 may include fixed network devices 108-1 that are stationary relative to the facility 102, as well as vehicular or otherwise mobile network devices 108-2. Correspondingly, the foreign network devices 110 may also include fixed network devices 110-1 and mobile network devices 110-2. Each fixed network device 108-1, 110-1 may be indicative of tools, equipment, robotics, machinery, or any other device that is autonomous, semi-autonomous, or at least partially dependent on network connectivity. Each domestic mobile network device 108-2, and foreign mobile device 110-2 may include similar devices with the exception of being mobile, such as automated guided vehicles (AGVs), or the like.

Figure 2:
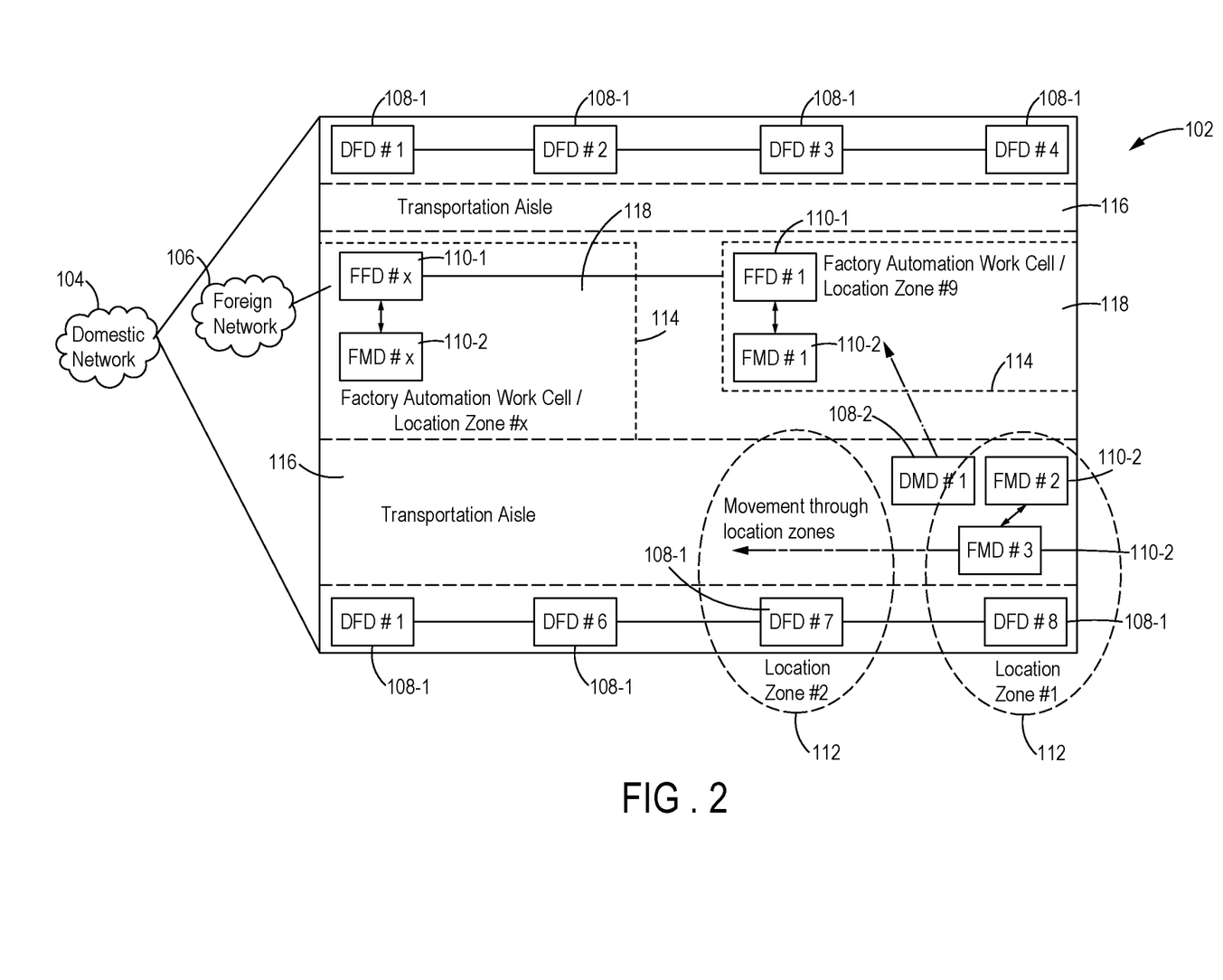
FIG. 2 is a diagrammatic view of another example management system for allocating a wireless frequency spectrum within a network environment in accordance with one or more embodiments of the disclosed principles.

As shown in FIG. 1, each of the domestic network 104 and the foreign network 106 mobile devices are real-time location tracking system 122 tracked to defined zones 112, 114 within the facility 102. The domestic network zone 112 may be indicative of the range of the domestic network 104 device 108-1 and the extent to which the real-time location tracking system 122 is able to track mobile network devices 108-2, 110-2 with attached location tags 124, within zone 112. Correspondingly, the foreign network zone 114 may be indicative of an effective range of the foreign network 106 device 110-1, and the extent to which the real-time location tracking system 122 is able to track mobile network devices 108-2, 110-2 with attached location tags 124 within zone 114 which may or may not spatially overlap with the domestic network zone 112. As further shown in FIG. 1, each of the domestic network zone 112 and the foreign network zone 114, as well as the fixed network devices 108-1, 110-1 may remain fixed relative to the facility 102 as shown in FIG. 2. In contrast, each of the mobile network devices 108-2, 110-2 may travel in and out of and be situated in either of the domestic network zone 112 or the foreign network zone 114 at any given moment. When a domestic or foreign mobile network device 108-2, 110-2 is situated within the domestic network zone 112, tracking system 122 geo-locates mobile network device 108-2, 110-2 via location tags 124 within the established virtual geo-location zone 112. Similarly, when the domestic or foreign mobile network device 108-2, 110-2 location tags 124 are situated within the foreign network zone 114, tracking system 122 geo-locates location tags 124 within established virtual geo-location zone 114.

Turning to FIG. 2, another network environment, or a manufacturing facility 102, is shown with several domestic network zones 112 and foreign network zones 114. As shown, a domestic network 104 may support a plurality of domestic fixed network devices 108-1, each having a respective domestic network zone 112, attached along transportation aisles 116 within the facility 102. Simultaneously, a foreign network 106 may support a plurality of foreign fixed network devices 110-1, each having a respective foreign network zone 114 and attached within work cells 118 between the transportation aisles 116.

Furthermore, the domestic fixed network devices 108-1 may be coupled to one another and to the domestic network 104 via wired connections, while the foreign fixed network devices 110-1 may be coupled to one another and to the foreign network 106 via respective wired connections. Moreover, the fixed network devices 108-1, 110-1 may be arranged such that the relevant mobile network devices 108-2, 110-2 will be in wireless communication with at least one network zone 112, 114 as they travel along the transportation aisles 116.

According to the embodiments shown in FIGS. 1 and 2, a domestic mobile network device 108-2 entering into the foreign network zone 114 may interfere with other established wireless communications within foreign network 106 and a foreign mobile network device 110-2 entering into the domestic network zone 112 may interfere with established wireless communications within domestic network 104. In order to mitigate interference between domestic mobile network devices 108-2, and foreign mobile network device 110-2 or other complications that may arise from sharing wireless channels, the network management system may implement an adaptive scheme to dynamically modify network configurations based on device location. Network configurations may correspond to network addresses, names, hostnames, indices, identification numbers, or other allocations assigned to each network device 108, 110.

When applied to the domestic network 104, the management system may be configured to temporarily allocate one or more channels of a frequency spectrum for use with a domestic mobile network device 108-2 for as long as the domestic mobile network device 108-2 is within the domestic network zone 112. Such allocations may persist for as long as the domestic mobile network device 108-2 is within range, and restored to a prior state when the network device 108-2 is no longer within the domestic network zone 112. Although not shown, it will be understood that 108-2 devices in foreign network 106 may be managed by similar schemes.

Turning back to FIG. 1, the network management system is comprised, in an embodiment, of at least one control unit 120, one or more tracking system 122, one or more location tags 124, and one or more databases 126. The network management system may be configured to via one or both of its control unit 120 and tracking system 122 to manage the network configurations of the network devices 108, 110 and allocate channels of the available frequency spectrum so as to mitigate issues related to network interference or congestion. The control unit 120 may be implemented using controllers, microcontrollers, processors, microprocessors, field programmable gate arrays (FPGAs), digital signal processors (DSPs), and/or any other programmable device.

The tracking system 122 may use any number of different techniques to track the locations of the mobile network devices 108-2, 110-2. For example, the tracking system 122 may use radio frequency identification (RFID), image or visual recognition, global positioning systems (GPS), and/or any other suitable tracking technique.

The type of location tag 124 that is used may vary based on the implemented tracking scheme. For instance, if a tracking system 122 uses an active radio frequency based tracking system, the location tags 124 may employ active radio frequency tags that are attached on a surface of the mobile network devices 108-2, 110-2 and configured to wirelessly interact with a real-time location tracking system. Other tracking techniques may employ other forms of location tags 124.

As shown in FIG. 1, whichever tracking scheme is implemented, the tracking system 122 may be configured to determine at least when a mobile network device 108-2, 110-2 enters or exits a given network zone 112, 114 based on the proximity or position of the location tags 124. Accordingly, the tracking system 122 may be positioned proximate to the outer perimeters of the network zones 112, 114, and/or within an appropriate range of the anticipated travel paths of the mobile network devices 108-2, 110-2, such as the transportation aisles 116 of FIG. 2.

Moreover, each of the location tags 124 may be uniquely identifiable such that the tracking system 122 is able to distinguish each mobile network device 108-2, 110-2. Correspondingly, the control unit 120 may be able to modify the network configurations of each mobile network device 108-2 or fixed device 108-1 based on the relative locations of the location tags 124. Furthermore, the control unit 120 may determine the appropriate modification to be applied by referring to the database 126.

The database 126 may retrievably store a plurality of predefined proximity policies or other relevant data that suggest the specific modifications to be applied for a mobile network device 108-2 that enters a given network zone 112, 114. The control unit 120 may restore the previous network configurations when the mobile network device 108-2 leaves the network zone 112, 114.

Figures 3, 4:
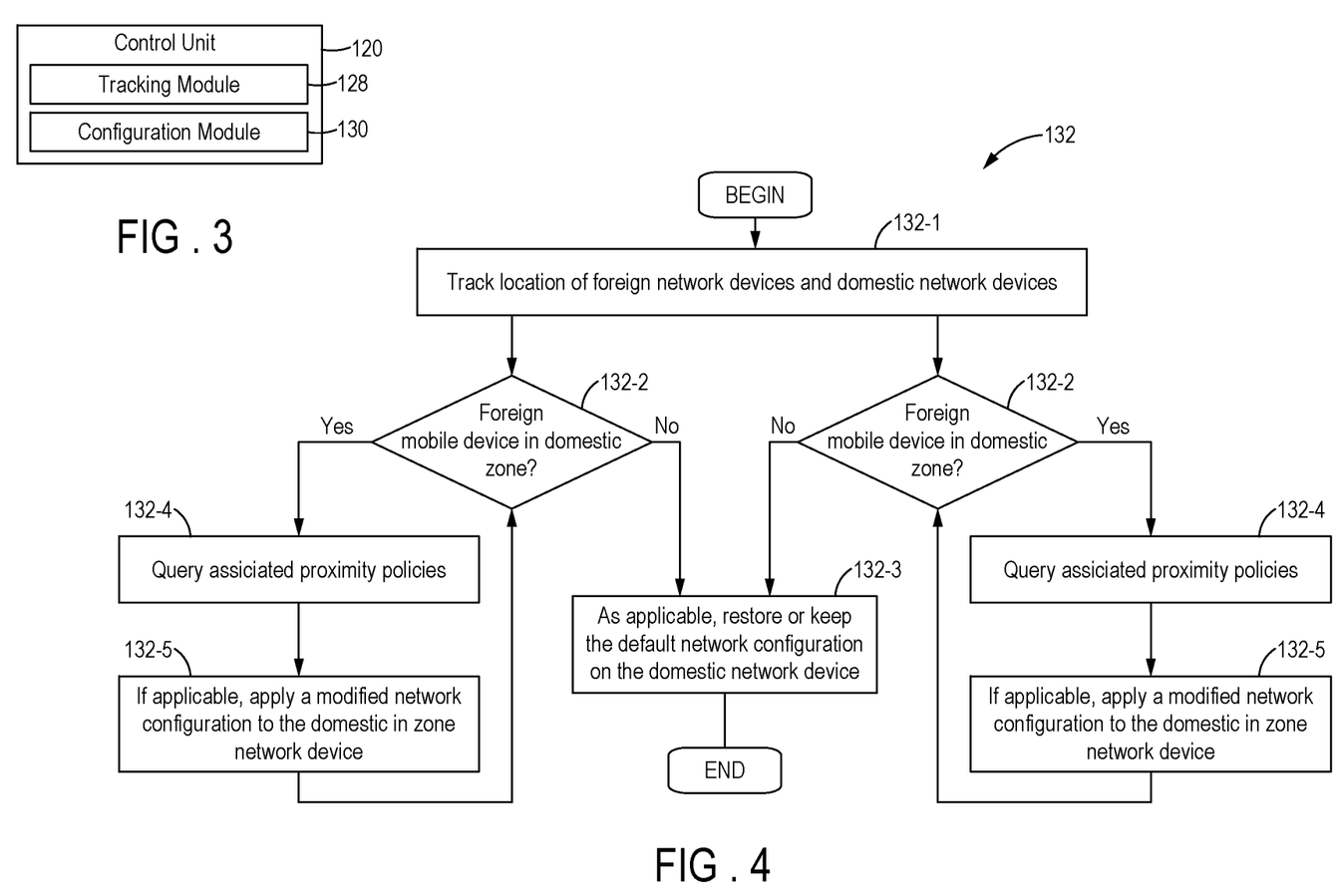
FIG. 3 is a schematic view of one example control unit for allocating a wireless frequency spectrum within a network environment in accordance with one or more embodiments of the disclosed principles.
FIG. 4 is a flow diagram of one example method of allocating a wireless frequency spectrum within a network environment in accordance with one or more embodiments of the disclosed principles.

Turning now to FIG. 3, one example embodiment of a control unit 120 of the network management system is provided. The control unit 120 may be preprogrammed according to one or more sets of algorithms or code that can generally be categorized into different modules, or combinations of hardware and software that are distinguishable by the types of tasks that are performed. In the embodiment of FIG. 3 for example, the control unit 120 may be preprogrammed to include at least a tracking module 128 and a configuration module 130. In general, the tracking module 128 may be configured to track the locations of the mobile network devices 108-2, 110-2 attached with location tags 124.

The configuration module 130 may be configured to receive information corresponding to the locations of the mobile network devices 108-2, 110-2 collected by the tracking module 128, and use the location information to allocate the wireless frequency spectrum in a manner which maintains efficient network connectivity and mitigates interference. Although only one implementation is provided, it will be understood that the control unit 120 may be preprogrammed according to any other suitable arrangement of modular sets of algorithms or code to perform comparable functions and/or produce comparable results.

More particularly, the tracking module 128 of FIG. 3 may be configured to track the locations of each individual domestic network device 108 and foreign network device 110. The tracking module 128 may track the individual mobile network devices 108-2, 110-2 continuously in real-time or periodically according to predefined intervals of time. The tracking module 128 may detect the proximity of each mobile network device 108-2, 110-2 by detecting location tags 124 attached on or within the mobile network devices 108-2, 110-2. The tracking module 128 may also track each mobile network device 108-2, 110-2 irrespective of the network 104, 106 to which it belongs.

For instance, a domestic mobile network device 108-2 may be tracked in either the domestic network 104 or the foreign network 106, and a foreign mobile network device 110-2 may be tracked in either the foreign network 106 or the domestic network 104, as long as the mobile network device 108-2, 110-2 is within readable range of the tracking module 128. As discussed above, the tracking module 128 may implement RFID, image or visual recognition, global positioning systems (GPS), and/or any other suitable tracking technique. Although the locations of fixed network devices 108-1, 110-1 may be predefined rather than tracked, fixed network devices 108-1, 110-1 may also be tracked nonetheless in some applications.

In addition, the configuration module 130 of FIG. 3 may be configured to dynamically adjust network configurations assigned to each network device 108, 110 based on the real-time or last-known location thereof. For instance, the configuration module 130 may be able to distinguish and identify each network device 108, 110 based on unique location tags 124 provided thereon. The database 126 may include a proximity policy for each location tag 124, or identified network device 108, 110, and each proximity policy may suggest an optimum network configuration for each network device 108, 110 when in a given network 104, 106.

In one example, if one or more domestic mobile network devices 108-2 enter a domestic network zone 112, the associated proximity policies may suggest temporarily allocating portions of the domestic wireless frequency spectrum for use by the entering domestic mobile network devices 108-2. The allocations may persist as long as the domestic mobile network devices 108-2 remain within the domestic network zone 112. If the one or more domestic mobile network devices 108-2 exit the domestic network zone 112, the associated proximity policies may suggest restoring the temporarily allocated portions of the wireless frequency spectrum to default network configurations. Similar proximity policies and schemes may be employed for devices 108-2 within the foreign network 114.

Turning now to FIG. 4, one example method 132 of allocating a wireless frequency spectrum of a domestic network 104 is diagrammatically shown. Although described in relation to managing a domestic network 104, it will be understood that similar processes may be mirrored and implemented in one or more of the foreign networks 106. As shown, the method 132 in block 132-1 may initially track the locations of each network device 108, 110.

As discussed with respect to the tracking module 128 of FIG. 3, for example, the method 132 in FIG. 4, which depicts the flow process of tracking foreign and domestic devices, may track the real-time or last-known location of each mobile network device 108-2, 110-2 by tracking location tags 124 in FIG. 1. The method 132 may additionally verify, or track with less frequency, the locations of each domestic fixed network device 108-1 and each foreign fixed network device 110-1. The method 132 in block 132-2 may further determine whether a domestic network mobile device 108-2 is within range of a given domestic network 104, or within the domestic network zone 112.

If no domestic mobile network device 108-2 is found within the domestic network zone 112, the method 132 may proceed to block 132-3 to maintain or restore default network configurations, such as network allocations universally accepted by both domestic and foreign networks 104, 106. The method 132 may then return to block 132-1 and continue tracking the network devices 108, 110.

If, however, a domestic mobile network device 108-2 travels into the domestic network zone 112, the method 132 of FIG. 4 may proceed to dynamically adjust the network configurations assigned to the domestic mobile network device 108-2. In block 132-4 for instance, the method 132 may query proximity policies associated with the incoming domestic mobile network device 108-2. More specifically, the method 132 may identify the incoming domestic mobile network device 108-2 using the unique location tag 124 thereof, and search the database 126 for proximity policies associated with the detected location tag 124. Similar proximity policies and schemes may be employed if a foreign mobile network device 110-2 travels into the domestic network zone 112.

Once an associated proximity policy is retrieved from the database 126, the method 132 in block 132-5 may apply a modified network configuration to a domestic fixed network device 108-1 or an incoming domestic mobile network device 108-2 according to the retrieved proximity policy. For example, the proximity policy may temporarily allocate portions of the domestic wireless frequency spectrum on a domestic fixed network device 108-1 or an incoming domestic mobile network device 108-2. The allocations may be designed such that network connectivity between the domestic network 104 and the domestic mobile network device 108-2 is modified such that other foreign mobile network devices 110-2 are uninterrupted by co-channel interference for as long as the foreign mobile network device 110-2 is within the domestic network zone 112.

Once any modifications to the network configurations or allocations have been performed, the method 132 in FIG. 4 may repeat and return to block 132-1 to continue tracking the location of the domestic mobile network device 108-2 or foreign mobile network device 110-2. The method 132 may maintain the modified network configurations for domestic network devices as long as the domestic mobile network device 108-2 or foreign mobile network device 110-2 is within the domestic network zone 112. If, however, the tracking information indicates that the domestic mobile network device 108-2 or foreign mobile network device 110-2 has exited the domestic network zone 112, the method 132 may proceed again to block 132-3 to restore default network configurations.

In other words, the method 132 may undo any of the allocations performed in block 132-5, so as to free the domestic wireless frequency spectrum for use by any other domestic mobile network device 108-2 or foreign mobile network device 110-2 that subsequently enters the domestic network zone 112. The method 132 of FIG. 4 may continue and reiterate in this manner continuously in real-time or at predefined intervals. Also, while only one embodiment of the method 132 is provided, it will be understood that other arrangements of processes are possible without departing from the scope of the appended claims.

It will be appreciated that the foregoing description provides examples of the disclosed apparatus, systems and methods. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context.

What is claimed is:

1. A system for allocating wireless frequency spectrum, the system comprising:
    a plurality of real-time location tags, each location tag being attached to a network device, each location tag having a unique identifier;
    a real-time location tracking system configured to detect the plurality of location tags;
    a database storing to store the unique identifiers of the plurality of location tags, each unique identifier being associated with a proximity policy for the network device having the location tag with the unique identifier; and
    a control unit in communication with each network device and programmed to query the database for the proximity policy associated with a detected network device, to allocate a wireless frequency channel according to the proximity policy associated with the detected network device, and to deallocate the wireless frequency channel and restore a default network configuration to the network devices, when the proximity policy associated with the detected network device is no longer effective.

2. The system of claim 1, wherein the real-time location tracking system tracks a location of each network device by detecting locations of the location tags attached to the network devices.

3. The system of claim 1, wherein the system operates within an environment having a foreign network and a domestic network, the foreign network including foreign network devices, the domestic network including domestic network devices, each network device being one of a fixed foreign network device, a mobile foreign network device, a fixed domestic network device and a mobile domestic network device, the real-time location tags being attached to at least the mobile foreign and domestic network devices.

4. The system of claim 3, wherein the foreign network devices are configured to communicate with the foreign network and the domestic network devices are configured to communicate with the domestic network, and at least one of the foreign network devices and the domestic network devices is movable between the foreign network and the domestic network.

5. The system of claim 3, wherein the real-time location tracking system is configured to detect the location tags from within the foreign network and the domestic network.

6. The system of claim 1, wherein the control unit is configured to communicate with the database to retrieve the proximity policies.

7. The system of claim 1, wherein the proximity policies are retrievably stored in the database where the unique identifiers are cross associated with foreign network device identifiers, domestic network device identifiers, and the proximity policies.

8. A control unit for allocating wireless frequency channels and spectrum within an environment including both a domestic network having domestic network devices and a foreign network having foreign network devices, the control unit comprising:
    a real-time location system tracking module configured to track locations of foreign network devices and domestic network devices; and
    a configuration module configured to query a database for one or more proximity policies associated with a tracked network device when the tracked device is detected within the foreign or domestic network, the database cross-associating each domestic and foreign network device with a real-time location tracking system tag identifier and one or more proximity policies, the configuration module configured to allocate a wireless frequency channel according to the proximity policy associated with the detected tracked device, and the configuration module configured to deallocate the wireless frequency channel and restore a previous network configuration to the foreign or domestic network devices, when the proximity policy associated with the detected network device is no longer effective.

9. The control unit according to claim 8, wherein the one or more proximity policies are associated with one or more respective proximity policy configuration files comprising information regarding wireless spectrums, wireless channels, wireless channel modulation, and transmitter or emitter power output at which one or more network devices are operating.

10. The control unit according to claim 9, wherein at least one of the one or more proximity policies are associated with one or more respective configuration change files comprising information regarding wireless interface configuration parameters and options which are uploaded to incorporate changes within a domestic network device dependent on wireless spectrum coexistence policies.

11. The control unit according to claim 9, wherein the control unit is further configured to invoke a coexistence management algorithm to make wireless interface configuration change decisions when one or more applicable proximity policy is discovered for an area or between adjacent areas.

12. The control unit of claim 8, wherein the foreign network devices and the domestic network devices include one or more fixed network devices and mobile network devices.

13. The control unit of claim 8, wherein the real-time location tracking module is configured to track the locations of the foreign network devices and the domestic network devices by detecting location tags attached on the foreign network devices and the domestic network devices, the tracking module being configured to communicate with one or more real-time location tracking systems to detect the locations of the location tags.

14. The control unit of claim 8, wherein the foreign network devices are configured to communicate with the foreign network and the domestic network devices are configured to communicate with the domestic network, and at least one of the foreign network devices and the domestic network devices is movable between the foreign network and the domestic network.

15. The control unit of claim 14, wherein the tracking module is configured to detect the foreign network devices and the domestic network devices from within the foreign network and the domestic network.

16. The control unit of claim 8, wherein the configuration module is configured to communicate with the database to retrieve the one or more proximity policies.

17. The control unit of claim 16, wherein the proximity policies are predefined and retrievably stored in the database.

18. A method of allocating wireless frequency spectrum within an environment having both a foreign network and a domestic network, the method comprising:
- tracking locations of foreign network devices and domestic network devices;
- detecting one or more of the foreign network devices and the domestic network devices within the environment;
- querying a database for one or more proximity policies associated with the detected network device;
- allocating a wireless frequency channel of the foreign network according to the one or more proximity policies associated with the detected network device if the detected network device is detected within the foreign network;
- allocating a wireless frequency channel of the domestic network according to the one or more proximity policies associated with the detected network device if the detected network device is detected within the domestic network; and
- deallocating any allocated wireless frequency channels and restoring a previous network configuration to the foreign or domestic network devices, when the one or more proximity policies associated with the detected network device is no longer effective.

19. The method of claim 18, wherein the foreign network devices and the domestic network devices include one or more fixed network devices and mobile network devices.

20. The method of claim 18, wherein the locations of the foreign network devices and the domestic network devices are tracked by detecting location tags attached to the foreign network devices and the domestic network devices, the location tags being detected using a real-time location tracking system module.

21. The method of claim 18, wherein the foreign network devices are configured to communicate with the foreign network and the domestic network devices are configured to communicate with the domestic network, and at least one of the foreign network devices and the domestic network devices is movable between the fixed foreign network and the fixed domestic network.

22. The method of claim 21, wherein the locations of the foreign network devices and the domestic network devices are tracked from within the fixed foreign network and the fixed domestic network by a real-time location tracking system.

23. The method of claim 18, wherein the proximity policies are predefined and retrieved from the database.

\* \* \* \* \*